US009685819B2

(12) United States Patent
Frampton (10) Patent No.: US 9,685,819 B2
(45) Date of Patent: Jun. 20, 2017

(54) REDUNDANT GENERATOR CONTROL

(71) Applicant: Kohler Co., Kohler, WI (US)

(72) Inventor: Isaac S. Frampton, Strattanville, PA (US)

(73) Assignee: Kohler, Co., Kohler, WI (US)

(*) Notice: Subject to any disclaimer, the term of this patent is extended or adjusted under 35 U.S.C. 154(b) by 511 days.

(21) Appl. No.: 14/262,419

(22) Filed: Apr. 25, 2014

(65) Prior Publication Data
US 2015/0311749 A1    Oct. 29, 2015

(51) Int. Cl.
*H02J 9/06* (2006.01)
*H02J 3/00* (2006.01)
*H02J 3/38* (2006.01)

(52) U.S. Cl.
CPC .............. *H02J 9/061* (2013.01); *H02J 3/005* (2013.01); *H02J 3/381* (2013.01); *H02J 9/066* (2013.01); *H02J 2009/068* (2013.01); *Y10T 307/62* (2015.04); *Y10T 307/718* (2015.04)

(58) Field of Classification Search
CPC .... H02J 9/061; H02J 9/06; H02J 9/066; H02J 2009/068; H02J 3/38; H02J 3/46; H02J 2003/001; H02J 3/005; Y10T 307/62; Y10T 307/636; Y10T 307/718; Y10T 307/391; G05B 2219/24182; H02P 9/00
See application file for complete search history.

(56) References Cited

U.S. PATENT DOCUMENTS

| 6,396,170 | B1 | 5/2002 | Laufenberg et al. |
| 7,096,117 | B1 | 8/2006 | Gale et al. |
| 7,290,170 | B2 | 10/2007 | Anderson et al. |
| 7,521,822 | B2 * | 4/2009 | Lorenz .................... H02H 7/06 307/64 |

(Continued)

FOREIGN PATENT DOCUMENTS

| EP | 2683078 A2 | 1/2014 |
| EP | 2690738 A2 | 1/2014 |

(Continued)

OTHER PUBLICATIONS

European Search Report for related European Application No. 15165008.2 dated Jul. 15, 2015.

(Continued)

*Primary Examiner* — Ryan Johnson
(74) *Attorney, Agent, or Firm* — Lempia Summerfield Katz LLC (57) ABSTRACT

A generator system may include redundant control. The generator system may include any combination of redundant controllers, redundant communication paths, or other redundant control. A generator system may include an electrical bus, a first generator controller, and the second generator controller. The first generator controller may control a first generator breaker for connecting a first generator to the electrical bus and configured to control an external breaker for selectively connecting the electrical bus to an external source. The second generator controller may control a second generator breaker for connecting a second generator (Continued)

to the common bus and configured to control the external breaker for selectively connecting the electrical bus to the external source.

20 Claims, 5 Drawing Sheets

(56) References Cited

U.S. PATENT DOCUMENTS

| | | | | |
|---|---|---|---|---|
| 7,615,888 | B2* | 11/2009 | Lathrop | H02J 3/14 307/64 |
| 7,747,356 | B2 | 6/2010 | Andarawis et al. | |
| 8,053,932 | B2* | 11/2011 | Eguchi | H02J 3/38 307/84 |
| 8,065,022 | B2 | 11/2011 | Minto et al. | |
| 8,504,178 | B2 | 8/2013 | Kakino et al. | |
| 8,631,275 | B2 | 1/2014 | Opina, Jr. et al. | |
| 9,054,553 | B2* | 6/2015 | Colombi | H02J 9/062 |
| 2002/0190576 | A1* | 12/2002 | Kern | H02J 3/38 307/18 |
| 2011/0018353 | A1 | 1/2011 | Yu | |
| 2011/0276190 | A1 | 11/2011 | Lillis et al. | |
| 2012/0032003 | A1 | 2/2012 | McMahon et al. | |
| 2012/0226368 | A1 | 9/2012 | Thomson et al. | |
| 2012/0226386 | A1 | 9/2012 | Kulathu et al. | |
| 2012/0228947 | A1 | 9/2012 | Noy | |
| 2013/0035772 | A1 | 2/2013 | Pearson et al. | |
| 2013/0066470 | A1 | 3/2013 | Wang et al. | |
| 2013/0158726 | A1 | 6/2013 | Mauk | |
| 2013/0181528 | A1 | 7/2013 | Colombi et al. | |
| 2013/0338843 | A1 | 12/2013 | Iravani et al. | |

FOREIGN PATENT DOCUMENTS

| | | |
|---|---|---|
| EP | 2713469 A2 | 4/2014 |
| WO | WO2012130246 | 10/2012 |

OTHER PUBLICATIONS

A Revolutionary Approach: Quad Redundancy Control, 2009, General Electric.

* cited by examiner

REDUNDANT GENERATOR CONTROL

TECHNICAL FIELD

This disclosure relates in general to a redundant generator control, or more particularly, multiple generator controllers each capable of at least one redundant control feature for a generator system and/or connected with redundant communication paths.

BACKGROUND

The reliability of power companies depends on many factors such as the weather, usage spikes, short circuits, accidents or other damage to transmission lines or power stations. Certain locations may be particularly prone to blackouts. Low lying areas may be susceptible to floods. Coastal areas may be susceptible to hurricanes. High usage geographic areas may be susceptible to rolling blackouts.

Any breaks in power utility service may be unacceptable to customers, and some businesses may have mission critical systems, such as computer systems in call centers or refrigerators in grocery stores, that rely on constant power. In other businesses such as hospitals, lives may be lost if the power to a respirator is interrupted. These customers may rely on a backup source of power.

One backup source of power is a generator. The generator, or multiple generators, is connected to the system in addition to the power utility service. Multiple points of failures exist with a generator system. In some examples, when any one of multiple devices experiences a failure, the entire generator system is shut down.

BRIEF DESCRIPTION OF THE DRAWINGS

Exemplary implementations are described herein with reference to the following drawings.

DETAILED DESCRIPTION

An engine-generator set, which may be referred to as a generator or a genset, may include an engine and an alternator or another device for generating electrical energy or power. One or more generators may provide power to a load through a generator bus. The generator bus is an electrical conductive path and may be selectively connected through multiple circuit breakers or other types of switches to the generators, the utility system, and other devices.

Consider a generator system including two generators connected to a generator bus through circuit breakers and a utility connection coupled to the generator bus through a utility breaker. Each generator may include a local generator controller, and a utility controller (e.g., programmable logic controller) may manage the utility breaker. In other examples, the utility control may also control breakers between the generators and the generator bus. These types of generator systems suffer from several single points of failure, such as the utility breaker controller, the power supply to the any controller, and communications between the utility breaker controller and generator controllers, as described below.

If a generator controller fails or if the communication path between a generator controller and corresponding generator fails, the corresponding generator stops operating and no longer supplies power to the generator bus. A generator controller failure may also lead to an overload on the remaining generators, which may cause the remaining generators to fail. The generator corresponding to the failed generator controller may be operable, but cannot be utilized by the generator system.

If the utility controller fails, the utility cannot be connected or disconnected from the generator bus. Thus, the generator system may continue to run when no longer needed, or in other scenarios, the generator system may not be able to supply power to the load because the generator bus is electrically connected to a dead or inoperable utility. When the utility controller also controls the generator breakers or the utility breaker is interlocked with the generator breakers, a failure at the utility breaker or utility controller could render all generators in the generator system unusable.

The following examples eliminate many of the single points of failure in the generator system with one or more redundant controllers. A redundant controller may be a generator controller that is primarily associated with a particular generator but may also issue command signals to other generators or any of the circuit breakers. A generator controller may be considered redundant because the generator controller duplicates one or more functions of another generator controller. Two or more generator controllers may be considered redundant because the generator controllers may independently control an external circuit breaker. Any generator controller or the utility controller may fail and a remaining controller is still operable to control the utility breaker. The generator controllers may be connected to redundant communication paths in which more than one communication path exits between a generator controller and an external device. Additional single points of failure that may be avoided using redundant controllers or communication paths may include the contacts between the various devices in the generator system and the bus or communication paths.

Figure 1:
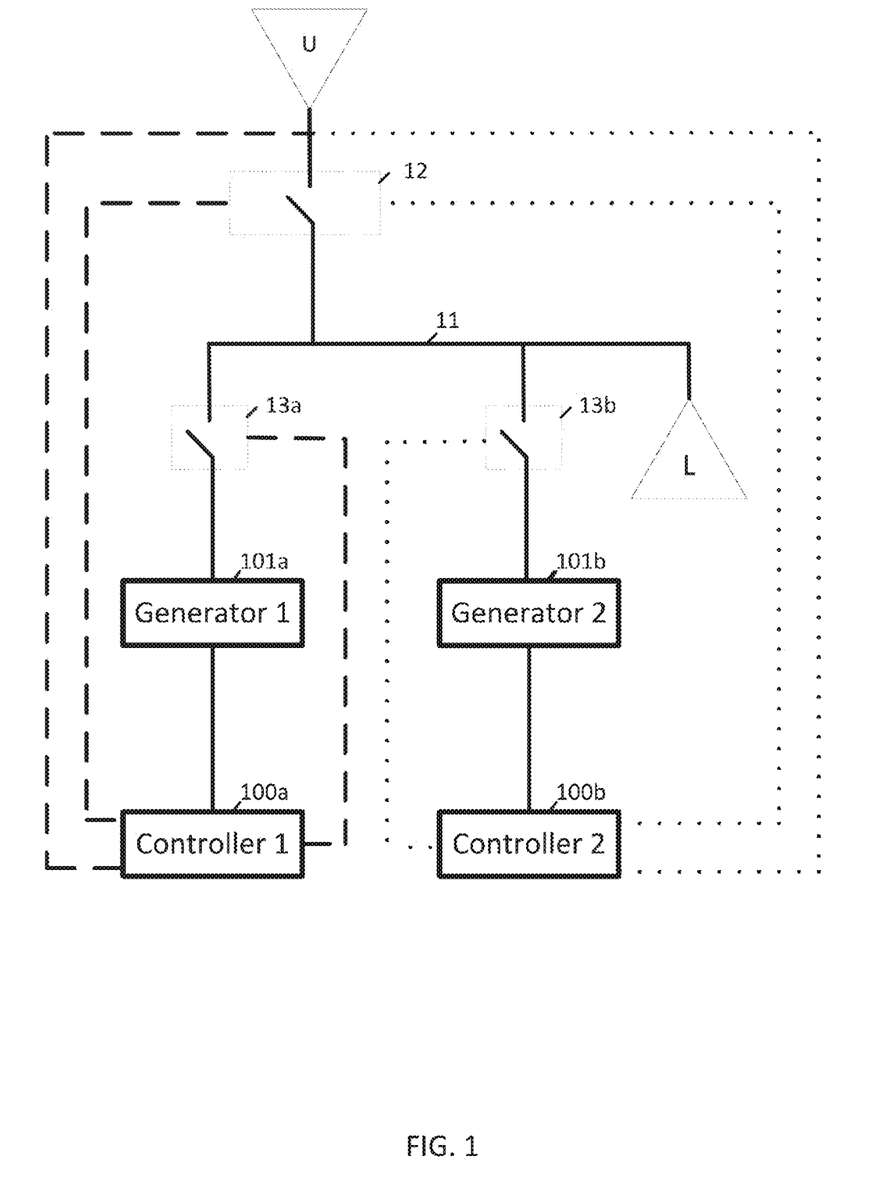
FIG. 1 illustrates an example system including redundant generator controllers.
Figure 2:
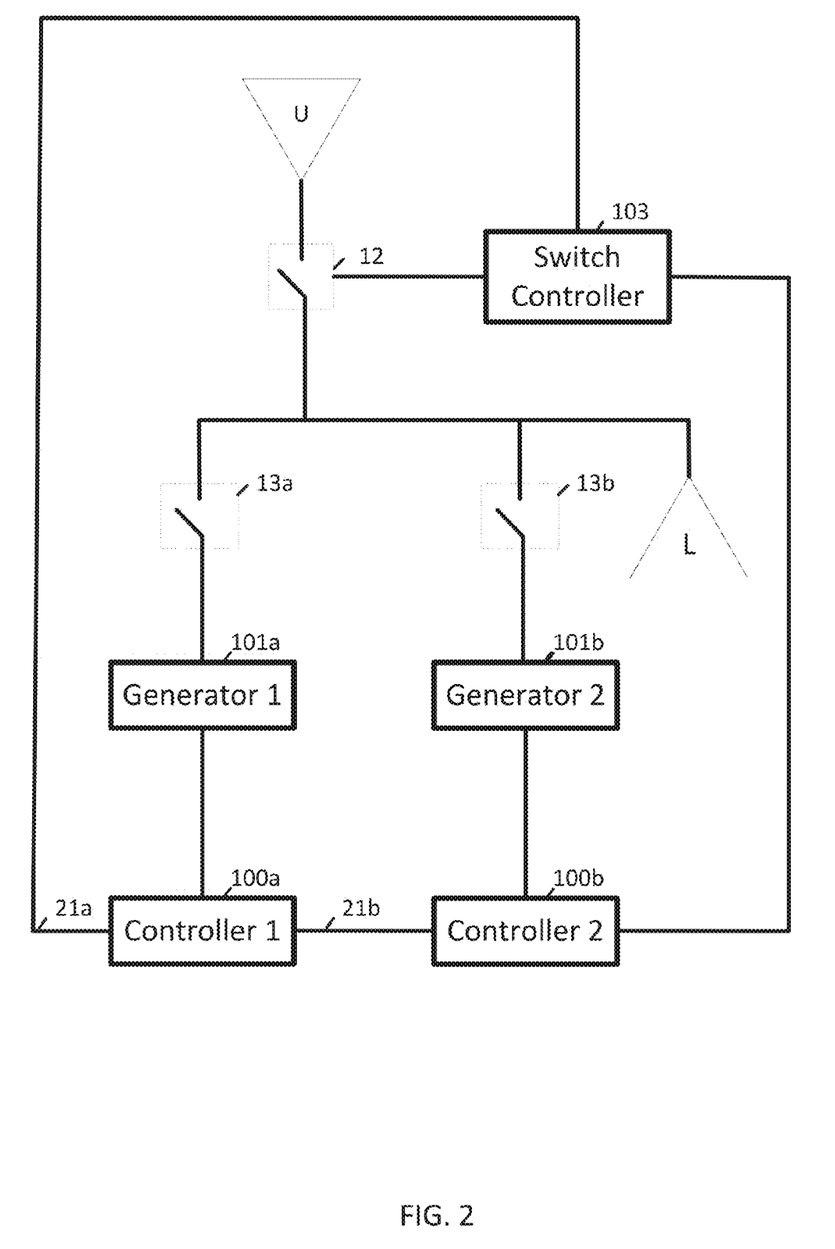
FIG. 2 illustrates an example system including redundant communication paths.

FIG. 1 illustrates an example system including redundant generator controllers. The system includes generators 101a and 101b and corresponding controllers 100a and 100b. Additional generators may be included. The generators 101a and 101b are electrically connected through the generator bus 11, which is also connected to the utility system U through a circuit breaker 12. Generator 101a is connected to a load L by a circuit breaker 13a, and generator 101b is connected to the load L by a circuit breaker 13b. Each of the generators 101a and 101b may be independently connected to the utility system U. Additional, different, or fewer components may be included in the system. FIG. 2 illustrates another system including redundant generator controllers and a switch controller 103.

The generators 101a-b may also include a fuel supply, a speed governor, a cooling system, an exhaust system, a lubrication system, and a starter. Additional, different, or fewer components may be included. Example types of generators include towable generators, portable generators, marine generators, industrial generators, residential generators or other standby generators. The generators may be portable or permanent.

The generator controller 100a controls circuit breaker 13a for selectively connecting generator 101a to generator bus 11 and controlling an external breaker (e.g., circuit breaker 12) for selectively connecting the generator bus 11 to an external source. The generator controller 100a may also control circuit breaker 13b for selectively connecting generator 101b to generator bus 11. In some examples, the external source is a utility power system or another non-generator power source. Additional non-generator power sources include solar power, wind turbines, hydroelectric power, batteries, and other sources.

The generator controller 100a is connected both through generator bus 11 and a communication path to generator controller 100b. In one alternative, the separate communication path is omitted and the generator bus 11 also serves as the communication path. The generator controller 100b is also operable to send a command for the external breaker (e.g., circuit breaker 12) to selectively connect the generator bus 11 to the circuit breaker 12. The generator controller 100b also may control circuit breaker 13b for selectively connecting generator 101b to generator bus 11 and circuit breaker 13a for selectively connecting generator 101a to generator bus 11.

Any of the generator controllers 100a and 100b may generate switch commands for any of the circuit breakers 12, 13a, and 13b to connect respective devices to the generator bus 11. The switch command may include any combination of an origin address, a destination address, a close code, and an open code. The origin address may identify the sending generator controller, and the destination address may identify the circuit breaker. The close code instructs the circuit breaker to connect the respective device to the generator bus 11, and the open code instructs the circuit breaker to disconnect the respective device from the generator bus 11.

Any of the generator controllers 100a and 100b may monitor communications sent by other generators controllers or by the optional switch controller 103 of FIG. 2. The communications may include switch commands between controllers and circuit breakers, operating controls for the generators, or status signals reporting operating parameters for the generators.

The communications may be monitored because communications from the generators controllers are sent to all connected devices. For example, a switch command from the generator controller 101a to circuit breaker 13a would also be sent from the generator controller 101a to the generator controller 101b and optionally, other devices. In another example, a switch command for the circuit breaker 12 from the generator controller 101b would also be received at generator controller 101a.

The communication may be monitored because communications in the generator system are routed through the generator bus 11. The communications may be a high frequency signal modulated on the power signal of the generator bus 11. The communications may be a publication and subscription messaging system in which messages or commands from any of the controllers may be subscribed to by other devices.

Any of the generator controllers 100a and 100b may monitor the existence of communications between any of the controllers and any of the circuit breakers. For example, generator controller 100a may monitor communications between the generator 101b and the circuit breaker 12 to identify when a break in those communications or an absence of those communications occur. The break or absence indicates that the generator controller 101b is not controlling the circuit breaker 12 for the external source. In response to a break or absence of the communication, the generator controller 100a may take over and communicate (e.g., send commands, receive status signals) with the circuit breaker 12. In response to a break or absence of the communication, the generator controller 100a may communicate directly with the generator controller 100b to troubleshoot the break or absence of communication.

Any of the generator controllers 100a and 100b may send messages addressed to the other controllers in the system. The messages may include at least one operating parameter of the sending generator, an identifier for the sending generator, or a peer generator command from the second generator.

The identifier may include a code that is associated with the type of sending device (e.g., G for generator, S for transfer switch, or U for utility). The identifier may include a serial number of the sending device, a model number of the sending device, a rating of the sending device, or a network address of the sending device. The rating of the sending device may be a power rating (e.g., 20 kW, 40 kW, or another value), a voltage rating (e.g., 50 V, 120 V, 240 V, or another value), or an age rating (e.g., number of operating hours, model year, or another value).

Any of the generator controllers 100a and 100b may exchange operating parameters. The operating parameter of the sending generator may describe a speed, an output voltage, an output phase angle, or a breaker status of the sending generator. The operating parameters may include settings or outputs from the generators 101a or 101b. The operating parameters may be inferred from settings (e.g., when the generator is set to output 120V, the operating parameter indicates 120V even though actual levels may vary). The settings may include a power setting, a voltage output setting, a frequency setting or another output setting. Alternatively, the operating parameters may include measured data collected from one or more sensors. The sensors may include any combination of a voltage sensor, a current sensor, a tachometer, a torque sensor, a deflection sensor, a dynamometer, a positional sensor, or a revolution sensor.

The peer generator command may be sent from any of the generator controllers 100a and 100b to any other generator controller. The peer generator command may instruct the receiving generator controller to begin running, stop running, or to adjust output. The output adjustment may be an engine speed, an output power, a phase angle, or an output voltage. The output adjustment may be a target level, a percentage adjustment, or an absolute adjustment. The peer generator command may be generated and transmitted to the receiving generator controller in response to one or more operating parameters from the receiving generator controller in the past.

For example, the generator 101b may have been running at 50% for some amount of time, which is detected by the generator controller 100a based on the operating parameters. The generator controller 100a may determine that the generator controller 100b experienced a failure (e.g., through direct communication, monitored communication, or another scenario). In response, the generator controller 100a may send peer generator commands to the generator 101a to cause the generator 101a to operate at the last known configuration, which in this case is 50% of capacity.

In another example, generator controller 100a may determine that the generator controller 100b experienced a failure, and in response, generate a start command for the generator 101b to start running. In other words, when the generator controller 100a determines that generator 101b has stopped running and the generator controller 100b has failed, the generator controller 100a steps in for generator controller 100b to start the generator 101b.

Any of the generator controllers 100a and 100b may generate load shedding commands in response to remove or add portions of the load to the generators 101a-b. Generator controller 100a may generate and transmit a load shed command to one or more switches to remove a portion of the load from generator 101b, and generator controller 100a may generate and transmit a load shed command to one or more switches to remove a portion of the load from generator 101b. The switches may be arranged in an array to put configurable loads on the generator bus 11 or directly coupled to a generator.

Either of the generator controllers 100a and 100b may generate switch commands for the external switch (e.g., utility circuit breaker 12). However, the generator controllers should not generate conflicting commands. Several techniques are possible to avoid conflicting commands.

In one example, the generator controllers may negotiate a priority algorithm to determine which of the generator controllers has priority for controlling the external breaker. The priority negotiation algorithm may be executed at the generator controllers or by logic co-located with the circuit breaker (e.g., switch controller 103). The generator controllers may exchange messages as described above, and the priority negotiation is executed by one or all of the generator controllers. The priority negotiation algorithm determines which of generator controller 100a and 100b takes priority based on any combination of a first generator to power up, a first generator controller to power up, a serial number priority, a model number priority, a capacity priority, a first generator to close to the electrical bus, or a random order priority. The priority negotiation algorithm may be configurable or user selected.

The generator controller that has priority under the priority negotiation algorithm may be referred to as the priority controller and the other controllers in the system may be referred to as secondary controllers. By default, all controllers may initially be designated as secondary controllers. The generator controller of the first generator to power up may designate itself the primary controller, which is advertised by sending messages to other controllers as they come online.

In other examples, the priority may be re-negotiated each time that a new generator controller comes online. In one example, the generator controllers exchange serial numbers of generator controllers or generators and the highest (or lowest) serial numbers is designated as the priority controller. In one example, the generator controllers exchange model numbers of generator controllers or generators and the highest (or lowest) model numbers is designated as the priority controller. In one example, the generator controllers exchange capacity ratings of output (e.g., 10 KW, 20 kW) or fuel (e.g., 5 gallon, 10 gallon) and the highest (or lowest) capacity is designated as the priority controller. In one example, the generator controllers exchange current output levels and the highest (or lowest) capacity is designated as the priority controller. In one example, the generator controllers exchange operation history (e.g., total operation hours, installation dates, time since last start, or another description of the lifetime of the generators) and the newest (or oldest) lifetime is designated as the priority controller. In another example, the priority negotiation algorithm may randomly select a controller as the priority controller.

In systems with more than two generators, the priority negotiation algorithm may assign several levels of priority using any of these examples. The priority list of several generators may be stored in memory by the generator controllers.

In another example, logic at the circuit breaker (e.g., a utility controller or switch controller 103) may execute the priority negotiation algorithm using any of these examples. Alternatively, the logic at the circuit breaker may designate priority using a first to arrive rule. The generator controller associated with the first generator to close to the generator bus 11 and be visible to the logic at the circuit breaker is designated as the priority controller. In another example, the logic at the circuit breaker may designate the closest (relative spatial position) generator controller as the priority controller. Relative spatial position may be determined using a global positioning system (GPS) or through a response time for a ping sent to the generator controllers.

In another example, the generator controllers may send a permission message before sending a command to the circuit breaker 12. The permission message may be sent between generators or to the utility controller. The permission message asks whether the other controllers are already designated as priority. If so, the sending controller designated itself as a secondary controller. If not, the sending controller designates itself as primary controller.

The priority may be set by relay logic (e.g., throwover relay) external to the generator controllers and utility controllers. In this example, two or more generator controllers may attempt to control the utility breaker 12. The relay logic determines priority by selecting a control signal from one of the generator controllers. The selection may be based on heartbeat signals (e.g., periodically changing digital signal) from the generator controllers.

FIG. 2 also illustrates an example system including redundant communication paths. Any of the devices in the system may communicate with any other device in the system through two or more communication paths. For example, generator controller 100a may communicate with generator controller 100b through communication path 21b. However, a redundant communication path 21a could also be used to reach generator controller 100b through switch controller 103. Thus, if communication path 21a fails, the generator controllers are still operable to communicate. The redundant communication path 21a may be longer than communication path 21b. Other arrangement other redundant communication paths may be used.

In addition or in the alternative to redundant generator controllers and redundant communication paths, other levels of redundancy may be used in the generator system. For example, redundant circuit breakers may provide backup switches to open or close an electrical path. The redundant circuit breakers may be in parallel or in series. Series circuit breakers may be used to open an electrical path. If one circuit breaker fails and is stuck closed, the other circuit breaker may be switched to open the path. Parallel circuit breakers may be used to close an electrical path. If one circuit breaker fails and is stuck open, the other circuit breaker may be switched to close the path. In another example, the generators or circuit breakers may have redundant sets of contacts.

Figure 3:
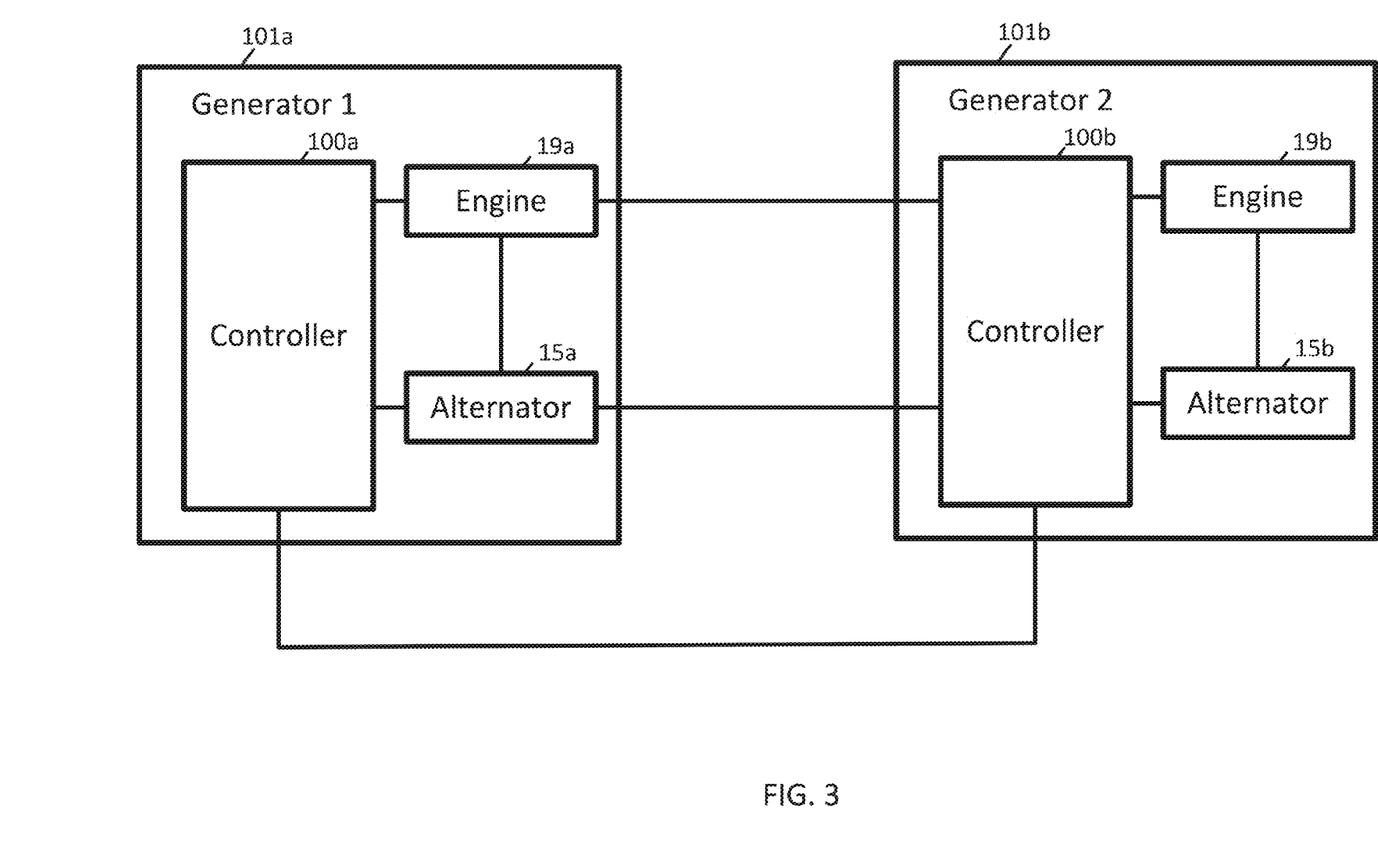
FIG. 3 illustrates an example system including redundant generator controllers.

FIG. 3 illustrates an example system including redundant generator controllers. In addition to the generator controllers 100a-b, the generators 101a-b include alternators 15a-b, and engines 19a-b. The alternators 15a and 15b may be electromechanical devices. The alternators 15a and 15b may include a rotating magnetic field and a stationary armature, a rotating armature with a stationary magnetic field, or a linear alternator. The engines 19a and 19b may be powered by gasoline, diesel fuel, or gaseous fuel. The gaseous fuel may be liquefied petroleum gas (LPG), hydrogen gas, natural gas, biogas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine. Natural gas (e.g., compressed natural gas (CNG)) may be a hydrocarbon gas mixture. Biogas may be a gas produced by the breakdown of organic material. Other variations are possible.

Each of the generator controllers 100a-b may be connected to the components of both (or more) generators. For example, generator controller 100a is connected to engine 19a and alternator 15a. The generator controller 100a may control the ignition, speed and other operation of the engine 19a, and the field winding current and other parameters of the alternator 15a. However, the generator controller 100a may also control the operation of engine 19a and parameters of alternator 15a.

The two controllers may also be directly connected to one another. The controllers may exchange status signals every predetermined time period (e.g., 100 ms, 1 second, 10 seconds, or another value). When the status signals indicate a failure, or either controller stops receiving status signals from the other controller, that controller is operable to seamlessly take over for the failed controller, for example, by sending commands to the failed generators engine and alternator.

The status signals may include different types of information and be received from a variety of devices. Status signals may include discovery data, operating parameters, measured data, or other information, and the status signals may be received from another generator, a central controller, a utility, or another device. The discovery data may be availability signals, connection information, or both.

An availability signal for a utility may include data indicative of whether or not the utility is available to supply power to the bus 11. Likewise, an availability signal for a generator may include data indicative of whether the generator is available to supply power to the bus 11. The status signal received from the bus 11 may include multiple availability signals from multiple devices.

The connection information may include a connection status for various devices. The connection status may include data indicative of whether the device is connected to the bus 11. The connection information may include a switch setting for a breaker such as breakers 13a and 13b. The switch stetting may indicate an ON status, an OFF status, an open status, or a closed status. The connection status may be received from controllers 100a and 100b or directly from the circuit breakers.

Figure 4:
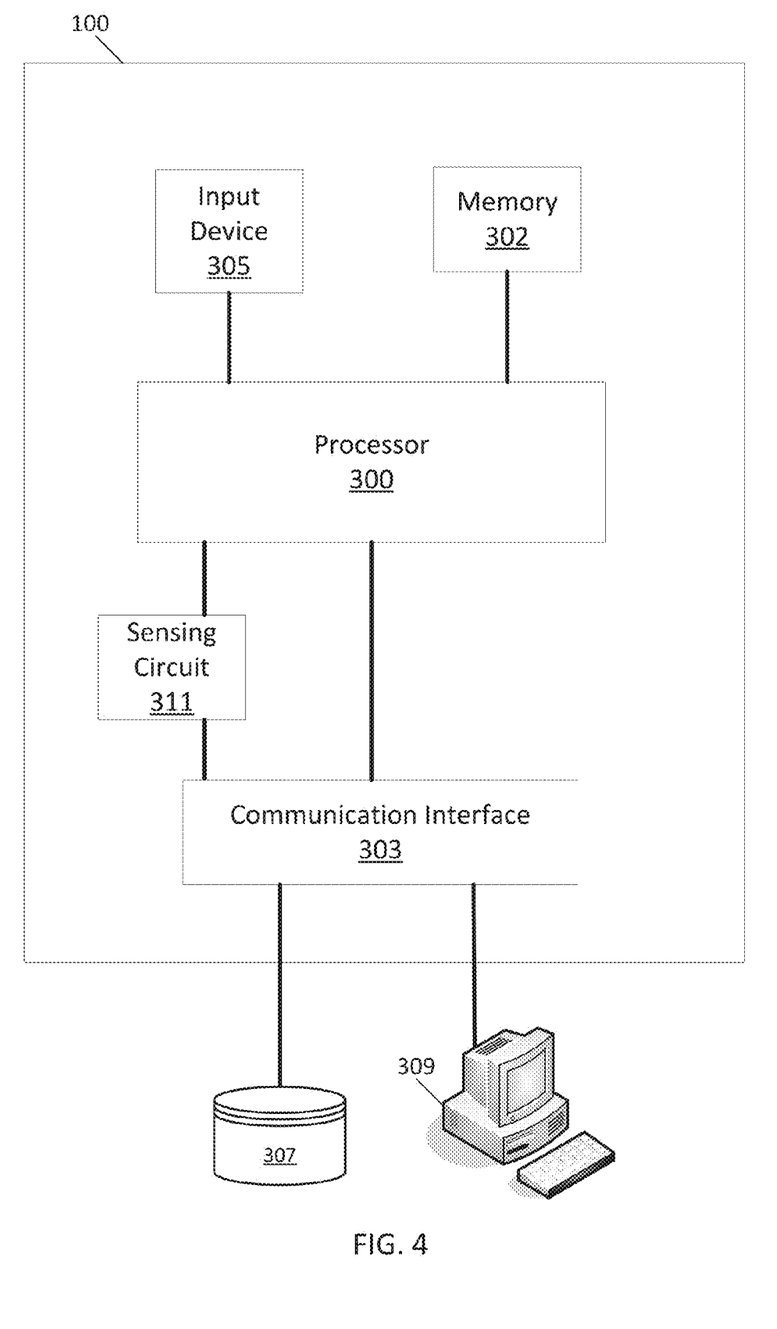
FIG. 4 illustrates an example redundant controller.

FIG. 4 illustrates an example generator controller 100 of the system for redundant control. The controller 100 may correspond to one or more of generator controller 100a, generator controller 100b, switch controller 103, or another device. The controller 10 may include a processor 300, a memory 302, and a communication interface 303. The generator controller 10 may be connected to a workstation 309 or another external device (e.g., control panel) and/or a database 307. Optionally, the generator controller 10 may include an input device 305 and/or a sensing circuit 311. The sensing circuit 311 receives sensor measurements for the operation of the generator or connected generators. Additional, different, or fewer components may be included.

The memory 302 may store data received through the communication interface 303 from the other generator controllers or directly from sensors or other components of the other generators. The processor 300 may extract an identifier, operating parameters, or peer commands from another generator from the received data. The processor 300 may determine that the other generator has experienced a failure from the received data. Based on the failure the processor 300 may generate and transmit commands for the other generator.

The processor 300 may determine the status of circuit breakers based on data monitored from the other generator controllers. The processor 300 may determine when the circuit breaker is not receiving commands from the other generator controllers. This may be based on an absence of communication from other generator controllers or based on an error code received from one or more other generator controllers.

The memory 302 may store operating parameters of the generators, identifiers for the generators, or a peer generator command from another generator. The memory 302 may log received operating states for the parallel generators. A portion of the memory 302 may be assigned to each generator in a set of parallel generators. Possible operating states may include disconnected, connected, running, disabled, an error identifier, over speed, a speed value, an output value, or a phase angle.

Figure 5:
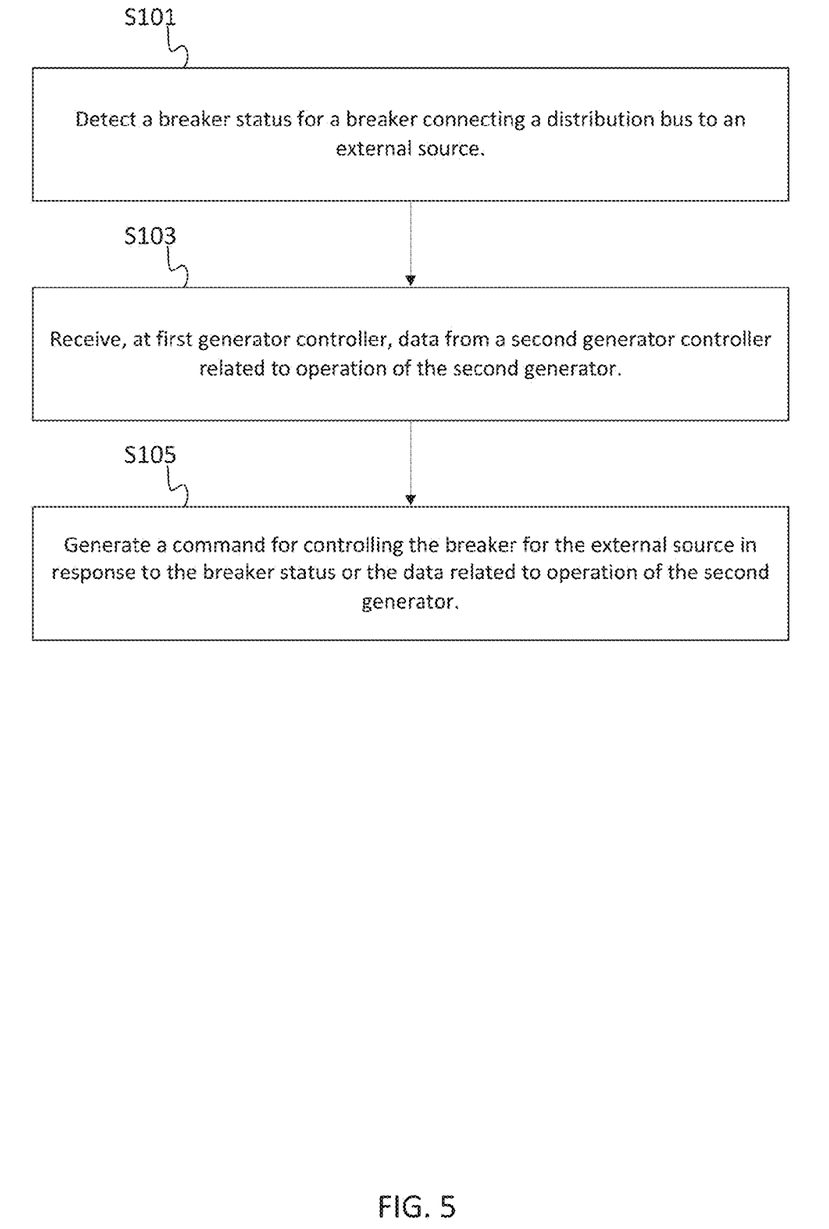
FIG. 5 illustrates example flowchart for operation of the redundant controller of FIG. 4.

FIG. 5 illustrates example flowchart for operation of the redundant controller of FIG. 4. The methods in FIG. 7 may, in some instances, be implemented as logic or software executable by a controller, such as controller 10. Additional, different, or fewer acts may be provided. The acts may be performed in the order shown or other orders. The acts may also be repeated.

At act S101, a generator controller detects a breaker status for a breaker connecting a distribution bus to an external source. The external source may be another generator, a utility, or another local source such as wind power or solar power. The distribution bus may be a generator bus as shown in FIGS. 1-3 or a connection between the generator and the load. The breaker status may identify whether the breaker is open or closed. Alternatively, the breaker status may identify whether the breaker is tripped, charged, in manual mode, or another mode.

At act S103, the generator controller receives data from the other generator controller related to operation of the second generator. The data may be communications between the other generator controller and the generator breaker. The data may be operating parameters of the other generator controller. The generator controller may analyze the data to determine that the other generator controller has failed or that the external breaker is no longer receiving communication from the other generator controller.

At act S105, the generator controller generates a command for controlling the breaker for the external source in response to the breaker status or the data related to operation of the second generator. In addition or alternatively, the generator controller may generate a command for shedding a portion of a load. Because one of the generators has failed, a capacity of the generator system has reduced.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 303 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 302 or database 307) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. An apparatus comprising:
   a first generator controller configured to control a breaker for connecting a first generator to a common bus and control an external breaker for selectively connecting the common bus to an external source; and
   a communication interface configured to connect the first generator controller with a second generator controller configured to send a command for the external breaker for selectively connecting the common bus to the external source.

2. The apparatus of claim 1, wherein the first generator controller is configured to monitor the command for the external breaker from the second generator controller.

3. The apparatus of claim 1, wherein the first generator controller receives at least one operating parameter from the second generator controller, wherein the first generator controller is configured to control the external breaker in response to the at least one operating parameter from the second generator controller.

4. The apparatus of claim 3, wherein the at least one operating parameter includes a speed, an output voltage, an output phase angle, or a breaker status from a second generator.

5. The apparatus of claim 4, wherein the first generator controller is configured to generate a command for the first generator in response to the at least one operating parameter from the second generator controller.

6. The apparatus of claim 1, wherein the first generator controller is configured to generate a start command for the first generator in response to data from the second generator controller.

7. The apparatus of claim 1, wherein the first generator controller is configured to generate a switch command for a switch to selectively connect a load to the common bus, and wherein the second generator controller is configured to generate a switch command for the switch to selectively connect the load to the common bus.

8. A system comprising:
   an electrical bus;
   a first generator controller configured to control a first generator breaker for connecting a first generator to the electrical bus and configured to control an external breaker for selectively connecting the electrical bus to an external source; and
   a second generator controller configured to control a second generator breaker for connecting a second generator to the common bus and configured to control the external breaker for selectively connecting the electrical bus to the external source,
   wherein the second generator controller is configured to receive at least one command between the first generator controller and the external breaker.

9. The system of claim 8, wherein the first generator controller and the second generator controller execute a priority negotiation algorithm for assigning priority for controlling the external breaker.

10. The system of claim 9, wherein the priority negotiation algorithm assigns priority to the first generator controller when the first generator controller powers up before the second generator controller.

11. The system of claim 8, wherein the second generator controller controls the external breaker in response to an absence or a break in the communications between the first generator controller and the external breaker.

12. The system of claim 8, wherein the first generator controller includes a memory configured to store data received from the second generator controller, and wherein the data received from the second generator controller includes at least one operating parameter of the second generator, an identifier for the second generator, or a peer generator command from the second generator.

13. The system of claim 12, wherein the identifier for the second generator includes a model number, a serial number or a power rating for the second generator.

14. The system of claim 12, wherein the peer generator command from the second generator instructs the first generator to begin running or to adjust output.

15. The system of claim 12, wherein the first generator controller is configured to generate a command for the first generator in response to the at least one operating parameter from the second generator controller.

16. The system of claim 11, wherein the first generator controller is configured to generate a load sharing command for removing a portion of a load from the second generator.

17. The system of claim 8, further comprising:
   a first communication path between the first generator controller and the second generator controller; and
   a second communication path between the first generator controller and the second generator controller.

18. A method comprising:
   detecting a breaker status for a breaker connecting a distribution bus to an external source, wherein the distribution bus electrically couples a first generator and a second generator to the external source;

receiving, at first generator controller, data from a second generator controller related to operation of the second generator; and generating a command for controlling the breaker for the external source in response to the breaker status and the data related to operation of the second generator.

19. The method of claim 18, further comprising:

monitoring communications from the second generator controller to the breaker, wherein generating the command for controlling the breaker comprises generating the command for controlling the breaker in response to the communication from the second generator controller to the breaker.

20. The method of claim 18, further comprising:

generating a command for shedding a portion of a load from the first generator in response to the command for controlling the breaker.

* * * * *